United States Patent [19]

Kawashima et al.

[11] Patent Number: 5,307,165

[45] Date of Patent: Apr. 26, 1994

[54] TELEVISION SIGNAL KIND DISCRIMINATING APPARATUS

[75] Inventors: Hiroyuki Kawashima, Tokyo; Yuji Okumura, Kanagawa, both of Japan

[73] Assignee: Sony Corporation, Tokyo, Japan

[21] Appl. No.: 29,342

[22] Filed: Mar. 10, 1993

[30] Foreign Application Priority Data

Mar. 17, 1992 [JP] Japan .................................. 4-091681

[51] Int. Cl.$^5$ ............................................. H04N 5/46
[52] U.S. Cl. ..................................... 348/441; 348/725
[58] Field of Search ................. 358/140, 11, 160, 188, 358/189, 191.1, 193.1, 181, 21 R, 148, 139; 375/116; H04N 5/46, 7/01

[56] References Cited

U.S. PATENT DOCUMENTS

| 4,860,098 | 8/1989 | Murphy | 358/188 |
| 5,132,793 | 7/1992 | Hirahata et al | 358/140 |
| 5,218,436 | 6/1993 | Sugiyama et al. | 358/140 |

FOREIGN PATENT DOCUMENTS

| 0221068 | 9/1989 | Japan | H04N 5/46 |
| 0236782 | 9/1989 | Japan | H04N 5/46 |
| 0113781 | 4/1990 | Japan | H04N 5/46 |
| 0035673 | 2/1991 | Japan | H04N 5/46 |
| 4-352580 | 12/1992 | Japan | H04N 12/92 |

Primary Examiner—James J. Groody
Assistant Examiner—Michael H. Lee
Attorney, Agent, or Firm—Lewis H. Eslinger; Jay H. Maioli

[57] ABSTRACT

A television signal kind discriminating apparatus discriminates an input television signal in a short time between a MUSE signal having a three-value type horizontal synchronizing signal and a popular television signal such as an NTSC signal having a horizontal synchronizing signal consisting only of signals of a single polarity. An input television signal is converted into a binary signal by a level comparator using a level between first and second polarity signal portions of the horizontal synchronizing signal of the MUSE signal, and the binary signal is delayed by a predetermined time by a delay circuit. An exclusive OR signal between the binary signal not delayed and the binary signal delayed is outputted from a gate, and a temporal position of a mid point of the horizontal synchronizing signal of the input television signal is detected by a detector. Whether the input television signal is a MUSE signal or a popular television signal is discriminated based on the exclusive OR signal within the predetermined time after the thus detected temporal position of the mid point of the horizontal synchronizing signal.

20 Claims, 4 Drawing Sheets

TELEVISION SIGNAL KIND DISCRIMINATING APPARATUS

BACKGROUND OF THE INVENTION

1. Field of the Invention

This invention relates to a television signal kind discriminating apparatus suitable to distinguish between a MUSE (Multiple Sub-Nyquist Sampling Encode) signal which is a form of a transmission signal of high definition television and a popular television signal.

2. Description of the Related Art

It sometimes occurs that one of BS NTSC broadcasting and MUSE broadcasting is alternatively transmitted on a single channel such as BS broadcasting. The two transmission systems are quite different in processing of both of an image and sound from each other. Accordingly, it is necessary to discriminate a kind of a received signal to change over the processing or muting of either or both and sound.

In a conventional television signal kind discriminating apparatus, whether or not a received signal is a MUSE signal is discriminated by detecting frame pulses which are a reference signal for each frame inserted in a MUSE signal. In the discriminating process of the conventional television signal kind discriminating apparatus, detection of frame pulses over a plurality of frames based on a flywheel effect is performed by taking a detection error of the frame pulses which is caused by noise or by some other factor into consideration.

If muting of sound is performed by the conventional television signal kind discriminating apparatus in accordance with a result of the discriminating method described above, then when an input television signal is changed over from a MUSE signal to an NTSC signal, noise is produced problematically for the time of 1/30×n seconds (n is a number of frames for detection of frame pulses based on a flywheel effect).

SUMMARY OF THE INVENTION

It is an object of the present invention to provide a television signal kind discriminating apparatus which can distinguish in a short time between a first television signal (for example, a MUSE signal) wherein a horizontal synchronizing signal has a signal portion of a first polarity, another signal portion of a second polarity opposite to the first polarity, and a further signal portion of a level intermediate between the first and second polarities and a second television signal (for example, an NTSC signal) wherein a horizontal synchronizing signal consists only of signals of the first polarity.

In order to attain the object described above, according to an aspect of the present invention, there is provided a television signal kind discriminating apparatus for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, which comprises level comparison means for converting the input television signal into a binary signal using a value between the first and second polarity signal portions of the horizontal synchronizing signal of the first television signal as a threshold value, delay means for delaying the binary signal outputted from the level comparison means by a predetermined time, exclusive OR gate means for outputting an exclusive OR of the binary signal outputted from the level comparison means and the binary signal outputted from the delay means, mid-point position detection means for detecting a temporal position of a mid point of the horizontal synchronizing signal of the input television signal, and discriminating means for discriminating, based on the output of the exclusive OR gate means within the predetermined time after the temporal position of the mid point of the horizontal synchronizing signal detected by the mid-point position detecting means, which one of the first and second television signals the input television signal is.

In the television signal kind discriminating apparatus, an input television signal is converted into a binary signal using a value between the first and second polarity signal portions of the horizontal synchronizing signal of the first television signal as a threshold value, and the binary signal is delayed for a predetermined amount of time by the delay means. An exclusive OR signal between the binary signal not delayed and the binary signal delayed is outputted from the exclusive OR gate means, and a temporal position of a mid point of the horizontal synchronizing signal of the input television signal is detected by the mid-point position detecting means. Whether the input television signal is the first television signal or the second television signal is discriminated based on the exclusive OR signal within the predetermined time after the detected temporal position of the mid point of the horizontal synchronizing signal. Accordingly, the kind of the television signal can be discriminated in a very short time in comparison with conventional television signal kind discriminating apparatus.

According to another aspect of the present invention, there is provided a television signal kind discriminating apparatus for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, which comprises signal converting means for converting the input television signal from an analog signal into a digital signal and outputting a most significant bit signal representative of a most significant bit of the digital signal, delay means for delaying the most significant bit signal outputted from the signal converting means by a predetermined time, exclusive OR gate means for outputting an exclusive OR of the most significant bit signal outputted from the signal converting means and the most significant bit signal outputted from the delay means, mid-point position detection means for detecting a temporal position of a mid point of the horizontal synchronizing signal of the input television signal, and discriminating means for discriminating, based on the output of the exclusive OR gate means within the predetermined time after the temporal position of the mid point of the horizontal synchronizing signal detected by the mid-point position detecting means, which one of the first and second television signals the input television signal is.

In the television signal kind discriminating apparatus, an input television signal is supplied to the signal converting means, and a most significant bit signal outputted from the signal converting means is delayed for the predetermined time by the delay means. An exclusive OR signal between the most significant bit signal outputted from the signal converting means and the most significant bit signal delayed by the delay means is outputted from the exclusive OR gate means, and a temporal position of a mid point of the horizontal synchronizing signal of the input television signal is detected by the mid-point position detecting means. Whether the input television signal is the first television signal or the second television signal is discriminated based on the exclusive OR signal within the predetermined time after the detected temporal position of the mid point of the horizontal synchronizing signal. Accordingly, the kind of the television signal can be discriminated in a very short time in comparison with conventional television signal kind discriminating apparatus.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
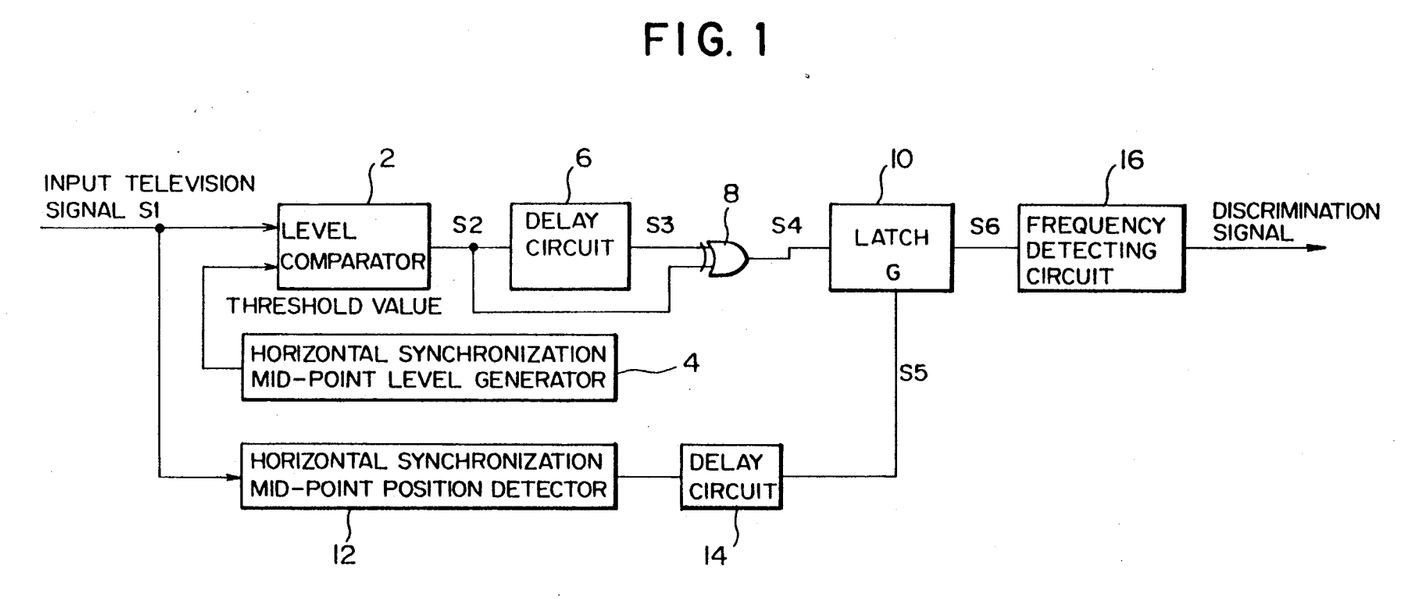
FIG. 1 is a block diagram of a television signal kind discriminating apparatus showing a first preferred embodiment of the present invention.

Referring first to FIG. 1, there is shown a television signal kind discriminating apparatus to which the present invention is applied. The television signal kind discriminating apparatus of the present embodiment is generally constructed such that it distinguishes between a MUSE signal wherein a horizontal synchronizing signal is a three-value synchronizing signal and has a signal portion of a first polarity (for example, the negative polarity), another signal portion of a second polarity (for example the positive polarity) opposite to the first polarity, and a further signal portion of a level intermediate between the first and second polarities, and a popular television signal wherein a horizontal synchronizing signal consists only of signals of the first polarity (for example, the negative polarity), such as, for example, an NTSC signal.

The television signal kind discriminating apparatus shown includes a level comparator 2 for converting an input television signal S1 into a binary signal S2 having two high ("H") and low ("L") levels using a signal of an intermediate or mid-point level between a first polarity signal portion and a second polarity signal portion of a horizontal synchronizing signal of a MUSE signal outputted from a horizontal synchronization mid-point level generator 4 as a threshold value and outputting the thus produced binary signal S2. A delay circuit 6 delays the binary signal S2 outputted from the level comparator 2 by a time $\tau$ and outputs it as a signal S3. An exclusive OR gate 8 outputs a signal S4 which represents an exclusive OR of the binary signal S2 outputted from the level comparator 2 and the binary signal S3 outputted from the delay circuit 6. The exclusive OR signal S4 is supplied to a data input terminal of a latch circuit 10. The latch circuit 10 outputs a signal supplied to the data input terminal thereof when a signal supplied to a G input terminal thereof is at the "H" level, but holds, when the signal supplied to the G input terminal thereof is at the "L" level, a signal supplied to the data input terminal thereof at a falling edge of the signal supplied to the G input terminal thereof.

A horizontal synchronization mid-point position detector 12 detects a temporal position of a mid point of a horizontal synchronizing signal of the input television signal and outputs a signal indicative of the position. A delay circuit 14 delays the output signal of the horizontal synchronization mid-point position detecting circuit 12 by a time $\tau/2$ and supplies a signal S5 thus obtained to the G input terminal of the latch circuit 10. The output signal S6 of the latch circuit 10 is supplied to a frequency detecting circuit 16.

The frequency detecting circuit 16 has a threshold value of a suitable frequency for the "H" level of the input signal S6, and determines, when the input signal S6 presents the "H" level in a high frequency, that the input television signal S2 is a MUSE signal, but determines, when the input signal S6 presents the "H" level in a low frequency (that is, presents the "L" level in a high frequency), that the input television signal S2 is a popular television signal such as, for example, an NTSC signal. The frequency detecting circuit 16 can assume various configurations such as a configuration which includes, for example, an integrator of a suitable time constant consisting of a resistor and a capacitor, and a comparator having a suitable threshold value, or another configuration which includes a counter for counting the period of the "H" or "L" level of the input signal S6.

The latch circuit 10, the delay circuit 14 and the frequency detecting circuit 16 described above constitutes discriminating means for discriminating, based on the output of the exclusive OR gate 8 within the delay time $\tau$ by the delay circuit 6 after the temporal position of the mid point of the horizontal synchronizing signal detected by the horizontal synchronization mid-point position detector 12, which one of a MUSE signal and a popular television signal such as, for example, an NTSC signal the input television signal is.

Figure 2:
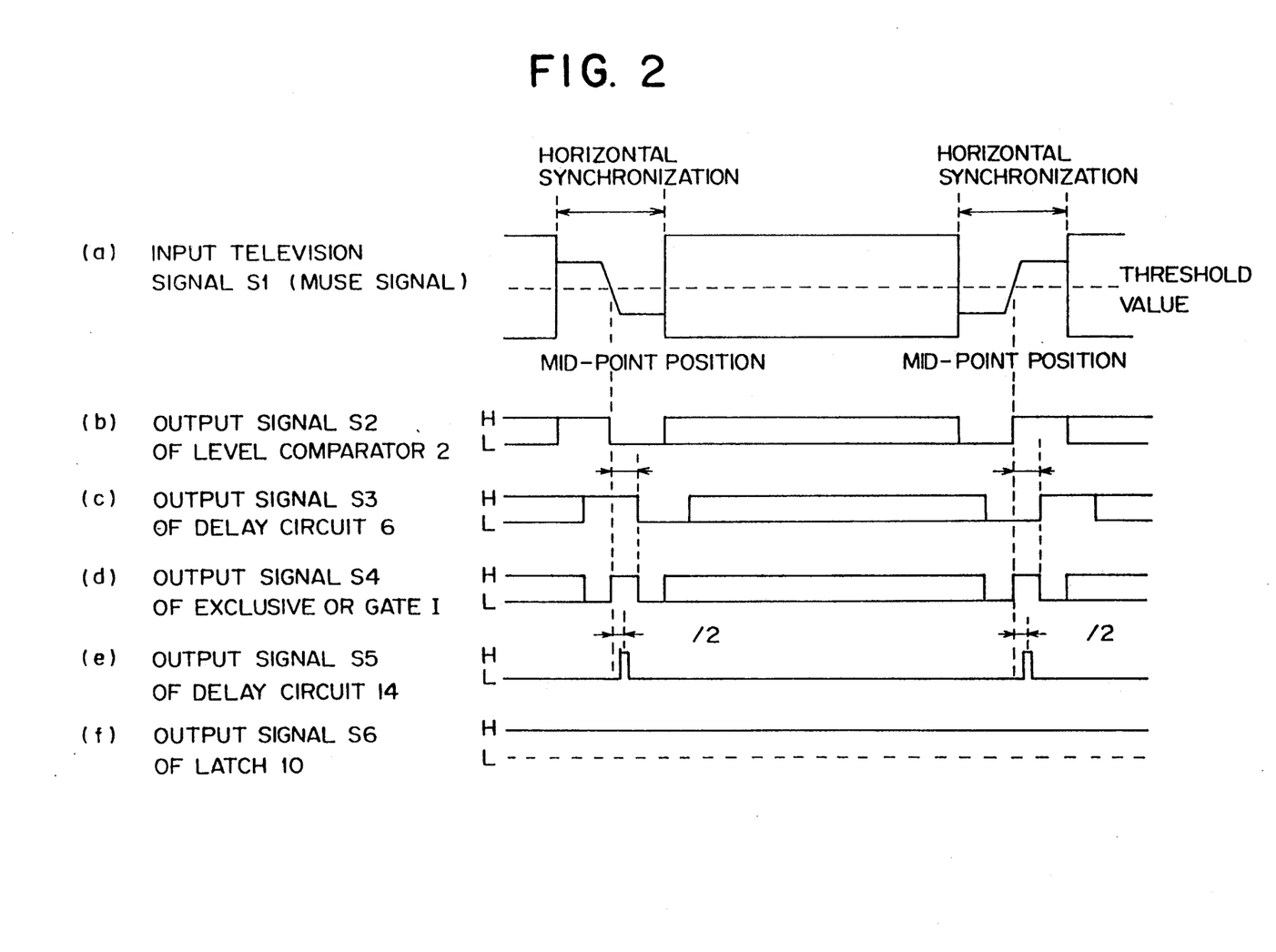
FIG. 2 is a time chart illustrating operation of the television signal kind discriminating apparatus when an input television signal is a MUSE signal.

FIG. 2 illustrates operation of the television signal kind discriminating apparatus of FIG. 1 when the input television signal S1 is a MUSE signal. The horizontal synchronizing signal of the MUSE signal is a three-value synchronizing signal and is reversed for each horizontal period as seen from the waveform (a) of FIG. 2. The MUSE signal is compared in level by the level comparator 2 with a mid-point level of the horizontal synchronizing signal of the MUSE signal as a threshold level so that it is converted into a binary signal S2 (refer to the waveform (b) of FIG. 2).

The binary signal S2 is delayed by the time $\tau$ by the delay circuit 6 to make a binary signal S3 (refer to the waveform (c) of FIG. 2). The exclusive OR gate 8 outputs an exclusive OR signal S4 between the binary signal S2 outputted from the level comparator 2 and the binary signal S3 outputted from the delay circuit 6 (refer to the waveform (d) of FIG. 2). The exclusive OR signal S4 presents the "H" level for the time τ after the mid-point position of the horizontal synchronizing signal of the MUSE signal S1 and is supplied to the data input terminal of the latch circuit 10.

The horizontal synchronization mid-point position detector 12 detects the temporal position of a mid point of the horizontal synchronizing signal of the MUSE signal S1 and outputs a signal indicative of the position. The delay circuit 14 delays the output signal of the horizontal synchronization mid-point position detecting circuit 12 by the time τ/2 and supplies a thus obtained signal S5 (refer to the waveform (e) of FIG. 2) to the G input terminal of the latch circuit 10. Consequently, the exclusive OR signal S4 which presents the "H" level for the time τ after the mid-point position of the horizontal synchronizing signal of the MUSE signal S1 is detected by the latch circuit 10 at a point of time delayed by the time τ/2 after the mid-point position of the horizontal synchronizing signal of the MUSE signal S1, and a signal S6 ("H") indicative of a result of the detection (refer to the waveform (f) of FIG. 2) is supplied to the frequency detecting circuit 16. The output signal S6 of the latch circuit 10 presents "H" for the full period. Consequently, the frequency detecting circuit 16 discriminates that the input television signal is a MUSE signal.

It is to be noted that, while, in the operation illustrated in FIG. 2, the output signal S6 of the latch circuit 10 always presents the "H" level when the input television signal S1 is a MUSE signal, it is estimated that the output signal S6 may present the "L" level in a low frequency due to an influence of noise, but since the threshold value of a suitable frequency is set in the frequency detecting circuit 16, the frequency detecting circuit 16 can discriminate with certainty that the input television signal is a MUSE signal.

On the other hand, when the input television signal S1 is a popular television signal such as, for example, an NTSC signal, since the output signal S6 of the latch circuit 10 presents the "L" level in a high frequency, the frequency detecting circuit 16 determines that the input television signal is a popular television signal such as an NTSC signal. In particular, when the input television signal S1 is an NTSC signal, since the horizontal synchronizing signal of the NTSC signal has the form of a negative pulse, the output of the level comparator 2 does not present a change-over between the "H" and "L" levels at any position within the horizontal synchronizing signal at all. Consequently, the position of an output pulse of the exclusive OR gate 8 does not come within the period of the horizontal synchronizing signal. On the other hand, the output of the horizontal synchronization mid-point position detector 12 comes within the horizontal synchronizing signal, and consequently, the output of the latch circuit 10 presents the "L" level.

With the television signal kind discriminating apparatus of the embodiment of FIG. 1, since discrimination of a signal is performed for each horizontal period, the kind of a television signal can be discriminated in a very short time from several horizontal periods (H) to ten and several horizontal periods (H).

Figure 3:
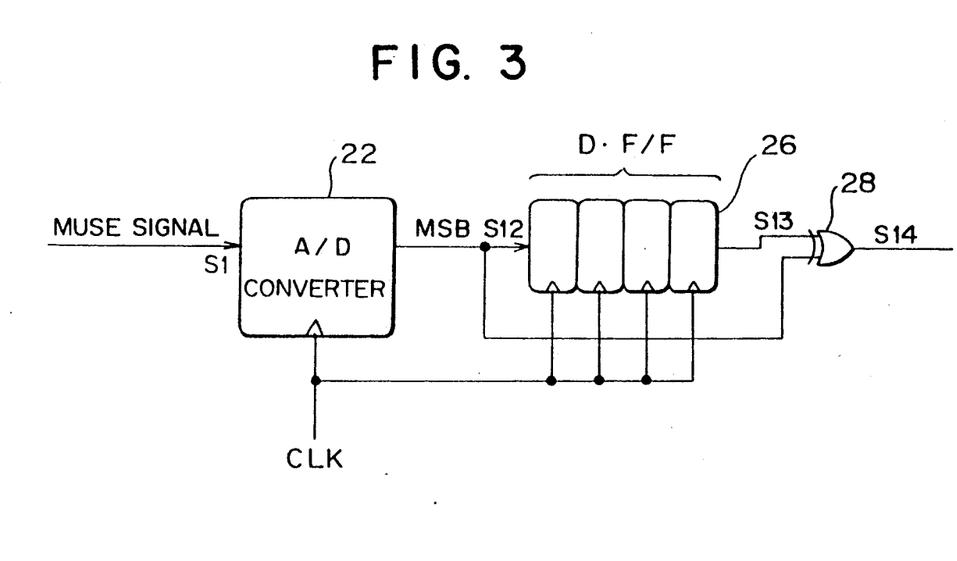
FIG. 3 is a block diagram of a modification to the television signal kind discriminating apparatus of FIG. 1.

Referring now to FIG. 3, there is shown a modification to the television signal kind discriminating apparatus of FIG. 1 described above. The modified television signal kind discriminating apparatus includes, in place of the level comparator 2, the horizontal synchronization mid-point level generator 4, the delay circuit 6 and the exclusive OR circuit 8 of FIG. 1, an analog to digital (A/D) converter 22 for converting an input television signal S1 from an analog into a digital signal and outputting a most significant bit (MSB) signal S12 representative of a most significant bit of the thus obtained digital signal, a shift register 26 for delaying the most significant bit signal S12 outputted from the analog to digital converter 22 by a time τ and outputting it as a signal S13, and an exclusive OR gate 26 for outputting an exclusive OR between the most significant bit signal S12 outputted from the analog to digital converter 22 and the most significant bit signal S13 outputted from the shift register 26. The shift register 26 may be constituted from a plurality of D-type flip-flops (synchronous flip-flops). The output signal S14 of the exclusive OR gate 28 is supplied to the data input terminal of the latch circuit 10 of FIG. 1.

The most significant bit signal S12 outputted from the analog to digital converter 22, that is, the most significant bit (MSB) of the MUSE signal after conversion into a digital signal, is itself a binary signal with a midpoint level of a horizontal synchronizing signal of the MUSE signal employed as a threshold value, and the shift register 26 delays the most significant bit signal S12 by the time τ. The exclusive OR gate 28 receives the most significant bit signal S12 from the analog to digital converter 22 and the most significant bit signal outputted from the shift register 26. The exclusive OR signal S14 from the exclusive OR circuit 28 is supplied to the latch circuit 10 and then to the frequency detecting circuit 16 so that the kind of the input television signal S1 is discriminated by the frequency detecting circuit 16 as described hereinabove.

Figure 4:
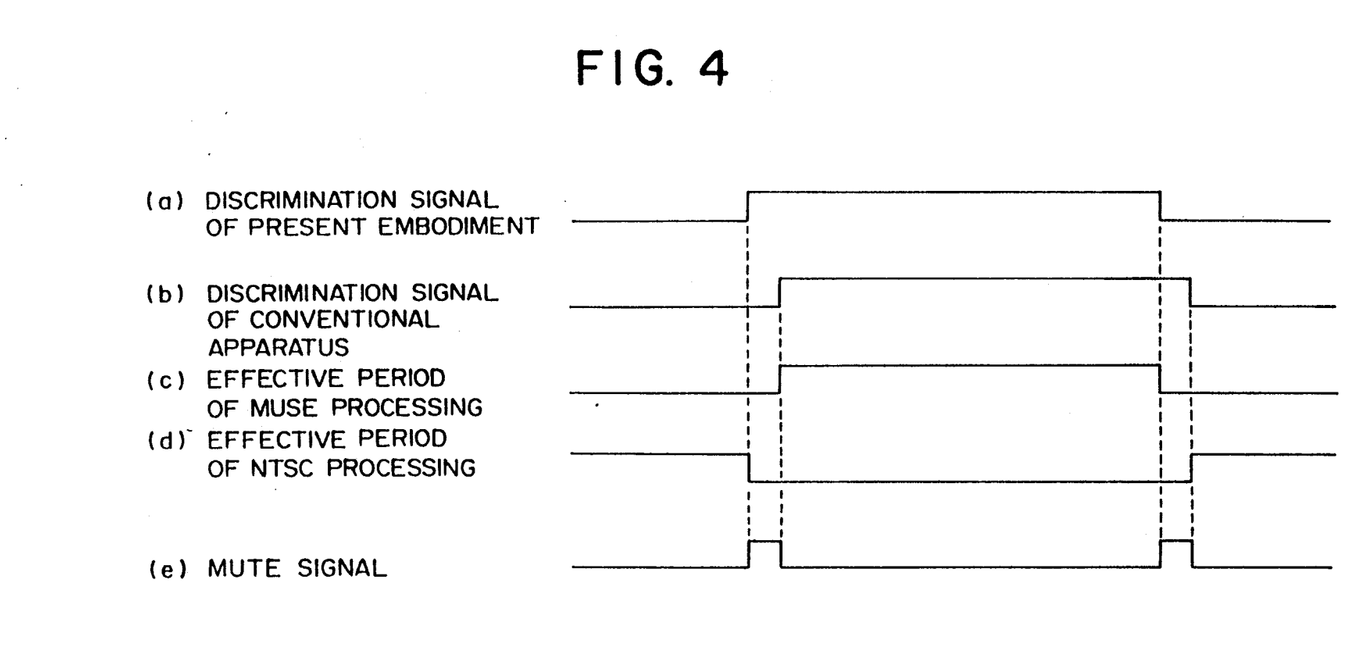
FIG. 4 is a time chart illustrating combination of a discrimination signal obtained by the television signal kind discriminating apparatus of FIG. 1 or 3 and another discrimination signal obtained by frame pulse detection by a conventional television signal kind discriminating apparatus to make a new discrimination signal.

FIG. 4 shows an example wherein a discrimination signal obtained by the television signal kind discriminating apparatus and another discrimination signal obtained based on frame pulse detection by a conventional television signal kind discriminating apparatus are combined to make a new discrimination signal. A signal indicative of a MUSE processing effective period shown by the waveform (c) of FIG. 4 can be obtained By logically ANDing the discrimination signal obtained by the television signal kind discriminating apparatus of the present invention shown by the waveform (a) of FIG. 4 and the discrimination signal by the conventional television signal kind discriminating apparatus shown by the waveform (b) of FIG. 4. Meanwhile, another signal indicative of an NTSC effective period shown by the waveform (d) of FIG. 4 can be obtained by logically ORing the discrimination signal by the television signal kind discriminating apparatus of the present invention shown by the waveform (a) of FIG. 4 and the discrimination signal by the conventional television signal kind discriminating apparatus shown by the waveform (b) of FIG. 4 and inverting a result of the logical ORing. Further, a mute signal shown by the waveform (e) of FIG. 4 can be obtained by logically exclusive ORing the discrimination signal by the television signal kind discriminating apparatus of the present invention shown by the waveform (a) of FIG. 4 and the discrimination signal by the conventional television signal kind discriminating apparatus shown by the waveform (b) of FIG. 4. The signal indicative of the MUSE processing effective period, the signal indicative of the NTSC processing effective signal and the mute signal obtained in this manner are more accurate than ever.

Having now fully described the invention, it will be apparent to one of ordinary skill in the art that many changes and modifications can be made thereto without departing from the spirit and scope of the invention as set forth herein.

What is claimed is:

1. A television signal kind discriminating apparatus for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, comprising:

level comparison means for converting the input television signal into a binary signal using a value between the first and second polarity signal portions of the horizontal synchronizing signal of the first television signal as a threshold value;

delay means for delaying the binary signal outputted from said level comparison means by a predetermined time;

exclusive OR gate means for outputting an exclusive OR signal between the binary signal outputted from said level comparison means and the binary signal outputted from said delay means;

mid-point position detection means for detecting a temporal position of a mid point of the horizontal synchronizing signal of the input television signal; and discriminating means for discriminating, based on the output of said exclusive OR gate means within the predetermined time after the temporal position of the mid point of the horizontal synchronizing signal detected by said mid-point position detecting means, which one of the first and second television signals the input television signal is.

2. A television signal kind discriminating apparatus for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, comprising:

horizontal synchronization mid-point level generating means for generating a value between the first and second polarity signal portions of the horizontal synchronizing signal of the first television signal;

level comparison means for comparing the levels of the input television signal and the value from said horizontal synchronization mid-point level generating means to convert the input television signal into a binary signal;

delay means for delaying the binary signal from said level comparison means by a predetermined time;

exclusive OR gate means for producing an exclusive OR signal between the binary signal from said level comparison means and the binary signal from said delay means;

mid-point position detection means for detecting a temporal position of a mid point of the horizontal synchronizing signal of the input television signal; and discriminating means for discriminating, based on the exclusive OR signal from said exclusive OR gate means occurring within the predetermined time after the temporal position of the mid point of the horizontal synchronizing signal detected by said mid-point position detecting means, when one of the first and second television signals the input television signal is.

3. A television signal kind discriminating apparatus for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, comprising:

level comparison means for converting the input television signal into a binary signal using a value between the first and second polarity signal portions of the horizontal synchronizing signal of the first television signal as a threshold value;

delay means for delaying the binary signal outputted from said level comparison means by a predetermined time;

exclusive OR gate means for outputting an exclusive OR signal between the binary signal outputted from said level comparison means and the binary signal outputted from said delay means;

mid-point position detection means for detecting a temporal position of a mid point of the horizontal synchronizing signal of the input television signal;

temporary storage means for storing therein the output of said exclusive OR gate means within the predetermined time after the temporal position of the mid point of the horizontal synchronizing signal detected by said mid-point position detecting means; and frequency detecting means for receiving the output of said temporary storage means to detect a frequency of the first or second polarity signal portion of the input television signal and discriminating the input television signal between the first and second television signals based on the result of the detection thereof.

4. A television signal kind discriminating apparatus according to claim 3, wherein said frequency detecting means has a frequency threshold value and compares the frequency of the first or second polarity signal portion of the input television signal with the threshold value and discriminates the input television signal between the first and second television signals such that, when the frequency is higher than the threshold value, the input television signal is the first television signal, but when the frequency is lower than the threshold value, the input television signal is the second television signal.

5. A television signal kind discriminating apparatus according to claim 3, wherein said temporary storage means includes a delay circuit for delaying the temporal position of the mid point of the horizontal synchronizing signal of the input television signal outputted from said mid-point position detection means by a second predetermined time, and a latch for latching the output of said exclusive OR gate means in response to the output of said delay circuit, said latch having an output connected to said frequency detecting means.

6. A television signal kind discriminating apparatus according to claim 5, wherein the second predetermined time is equal to one half the first-mentioned predetermined time.

7. A television signal kind discriminating apparatus for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, comprising:

- signal converting means for converting the input television signal from an analog signal into a digital signal and outputting a most significant bit signal representative of a most significant bit of the digital signal;
- delay means for delaying the most significant bit signal outputted from said signal converting means by a predetermined time;
- exclusive OR gate means for outputting an exclusive OR signal between the most significant bit signal outputted from said signal converting means and the most significant bit signal outputted from said delay means;
- mid-point position detection means for detecting a temporal position of a mid point of the horizontal synchronizing signal of the input television signal; and
- discriminating means for discriminating, based on the output of said exclusive OR gate means within the predetermined time after the temporal position of the mid point of the horizontal synchronizing signal detected by said mid-point position detecting means, which one of the first and second television signals the input television signal is.

8. A television signal kind discriminating apparatus according to claim 7, wherein said delay means is a shift register.

9. A television signal kind discriminating apparatus according to claim 8, wherein said shift register is constituted from a plurality of D-type flip-flops.

10. A television signal kind discriminating apparatus for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, comprising:

- signal converting means for converting the input television signal from an analog signal into a digital signal and outputting a most significant bit signal representative of a most significant bit of the digital signal;
- delay means for delaying the most significant bit signal outputted from said signal converting means by a predetermined time;
- exclusive OR gate means for outputting an exclusive OR signal between the most significant bit signal outputted from said signal converting means and the most significant bit signal outputted from said delay means;
- mid-point position detection means for detecting a temporal position of a mid point of the horizontal synchronizing signal of the input television signal;
- temporary storage means for storing therein the output of said exclusive OR gate means within the predetermined time after the temporal position of the mid point of the horizontal synchronizing signal detected by said mid-point position detecting means; and
- frequency detecting means for receiving the output of said temporary storage means to detect a frequency of the first or second polarity signal portion of the input television signal and discriminating the input television signal between the first and second television signals based on the result of the detection thereof.

11. A television signal kind discriminating apparatus according to claim 10, wherein said frequency detecting means has a threshold value for the frequency and compares the frequency of the first or second polarity signal portion of the input television signal with the threshold value and discriminates the input television signal between the first and second television signals such that, when the frequency is higher than the threshold value, the input television signal is the first television signal, but when the frequency is lower than the threshold value, the input television signal is the second television signal.

12. A television signal kind discriminating apparatus according to claim 10, wherein said temporary storage means includes a delay circuit for delaying the temporal position of the mid point of the horizontal synchronizing signal of the input television signal outputted from said mid-point position detection means by a second predetermined time, and a latch for latching the output of said exclusive OR gate means in response to the output of said delay circuit, said latch having an output connected to said frequency detecting means.

13. A television signal kind discriminating apparatus according to claim 12, wherein the second predetermined time is equal to one half the first-mentioned predetermined time.

14. A television signal kind discriminating apparatus for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, comprising:

- horizontal synchronization mid-point level generating means for generating a value between the first and second polarity signal portions of the horizontal synchronizing signal of the first television signal;
- level comparison means for converting the input television signal into a binary signal using the generated value of said horizontal synchronization mid-point level generating means as a threshold value;
- first delay means for delaying the binary signal from said level comparison means by a predetermined time;

exclusive OR gate means for producing an exclusive OR signal between the binary signal from said level comparison means and the binary signal from said first delay means;

horizontal synchronization mid-point position detection means for detecting a temporal position of a mid point of the horizontal synchronizing signal of the input television signal;

second delay means for delaying the temporal position of the mid point of the horizontal synchronizing signal of the input television signal from said horizontal synchronization mid-point position detecting means by a second predetermined time;

a latch means for latching the exclusive OR signal from said exclusive OR gate means in response to an output of said second delay means; and frequency detecting means receiving an output of said latch means for detecting a frequency of the first or second polarity signal portion of the input television signal and discriminating the input television signal between the first and second television signals based on the result of the detection thereof.

15. A television signal kind discriminating apparatus for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, comprising:

analog to digital converting means for converting the input television signal from an analog signal into a digital signal and outputting a most significant bit signal representative of a most significant bit of the digital signal;

shift register means for delaying the most significant bit signal output from said analog to digital converter converting means by a predetermined time;

exclusive OR gate means for producing an exclusive OR signal between the most significant bit signal output from said analog to digital converting means and the delayed most significant bit signal from said shift register means;

horizontal synchronization mid-point position detection means for detecting a temporal position of a mid point of the horizontal synchronizing signal of the input television signal;

delay means for delaying the temporal position of the mid point of the horizontal synchronizing signal of the input television signal from said horizontal synchronization mid-point position detecting means by a second predetermined time;

a latch means for latching the exclusive OR signal from said exclusive OR gate means in response to the output of said delay means; and frequency detecting means receiving an output of said latch means for detecting a frequency of the first or second polarity signal portion of the input television signal and discriminating the input television signal between the first and second television signals based on the result of the detection thereof.

16. A television signal kind discriminating method for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, comprising the steps of:

comparing the level of the input television signal with a threshold level between the levels of the first and second polarity signal portions of the horizontal synchronizing signal of the first television signal to convert the input television signal into a binary signal;

delaying the binary signal by a predetermined time;

comparing the binary signal not delayed and the delayed binary signal with each other;

detecting a temporal position of a mid point of the horizontal synchronizing signal of the input television signal; and discriminating, based on a result of the second comparison within the predetermined time after the temporal position of the mid point of the horizontal synchronizing signal, which one of the first and second television signals the input television signal is.

17. A television signal kind discriminating method for discriminating an input television signal between a first television signal wherein a horizontal synchronizing signal has a signal portion of a first polarity, another signal portion having a second polarity opposite to the first polarity, and a further signal portion having a level intermediate between the first and second polarities, and a second television signal wherein a horizontal synchronizing signal consists only of signals of the first polarity, comprising the steps of:

converting the input television signal from an analog signal into a digital signal;

delaying a most significant bit signal representative of a most significant bit of the digital signal by a predetermined time;

comparing the most significant bit signal not delayed and the delayed most significant bit signal with each other;

detecting a temporal position of a mid point of the horizontal synchronizing signal of the input television signal; and discriminating, based on a result of the step of comparing within the predetermined time after the temporal position of the mid point of the horizontal synchronizing signal, which one of the first and second television signals the input television signal is.

18. A television signal kind discriminating method according to claim 16 or 17 comprising the further steps of:

obtaining a second discrimination signal based on a conventional television signal kind discriminating method comprising detecting frame pulses based on a flywheel effect over a number of frames; and ANDing a discrimination signal obtained from said step of discriminating when the first television signal is a MUSE signal and the second discrimination signal to obtain a signal representative of the effective period of MUSE television processing.

19. A television signal kind discriminating method according to claim 16 or 17 comprising the further steps of:

obtaining a second discrimination signal based on a conventional television signal kind discriminating method comprising detecting frame pulses based on a flywheel effect over a number of frames;

ORing a discrimination signal obtained from said step of discriminating when the first television signal is an NTSC signal and the second discrimination signal; and inverting a result of the step of ORing to obtain a signal representative of the effective period of NTSC processing.

20. A television signal kind discriminating method according to claim 16 or 17 comprising the further steps of:

obtaining a second discrimination signal based on a conventional television signal kind discriminating method comprising detecting frame pulses based on a flywheel effect over a number of frames;

exclusive ORing a discrimination signal obtained from said step of discriminating when the first television signal is an NTSC signal and the second discrimination signal to obtain a mute signal.

* * * * *

UNITED STATES PATENT AND TRADEMARK OFFICE
CERTIFICATE OF CORRECTION

PATENT NO. : 5,307,165
DATED : April 26, 1994
INVENTOR(S) : Hiroyuki Kawashima and Yuji Okumura It is certified that error appears in the above-indentified patent and that said Letters Patent is hereby corrected as shown below:

Col. 3, line 55, after "example" insert --,--

Col. 12, line 64, change "fo" to --to--

Signed and Sealed this

Thirty-first Day of October 1995

Attest:

BRUCE LEHMAN

*Attesting Officer*    *Commissioner of Patents and Trademarks*